United States Patent Office 3,458,524
Patented July 29, 1969

3,458,524
NOVEL 5-ALKYLAMINOALKOXIMINO-AZA-DIBENZO-[a,d]-CYCLOHEPTENES
Frank J. Villani, West Caldwell, N.J., assignor to Schering Corporation, Bloomfield, N.J., a corporation of New Jersey
No Drawing. Continuation-in-part of application Ser. No. 539,292, Apr. 1, 1966. This application Mar. 27, 1968, Ser. No. 716,355
Int. Cl. C07d *39/00;* A61k *25/00*
U.S. Cl. 260—295                    14 Claims

ABSTRACT OF THE DISCLOSURE

This invention relates to 5-alkylaminoalkoximino-aza-dibenzo[a,d]cycloheptenes and to their use as antihistaminic agents, these compounds being prepared by reacting the appropriate 5-oxo-aza-dibenzo[a,d]cycloheptene with an alkylaminoalkoxyamine.

---

This application is a continuation-in-part application of my co-pending application, Ser. No. 539,292, filed Apr. 1, 1966, now abandoned.

This invention relates to novel compositions of matter classifiable in the field of organic chemistry as oximino ethers of aza-dibenzo-[a,d]-cycloheptenes and to processes for making such compositions. More particularly this invention relates to new and useful 5-oximino ethers of aza-dibenzo-[a,d]cycloheptenes and the 10,11-dihydro analogs thereof and to processes of preparing such ethers and to the method of employing such ethers as therapeutic agents.

The invention sought to be patented in one of its composition aspects is described as residing in the concept of a chemical compound having the molecular structure of an aza-5-(di-lower-alkylamino-lower-alkoximino)-dibenzo-[a,d]-cycloheptene and the 10,11-dihydro analog thereof.

The invention sought to be patented in another of its composition aspects resides in the concept of pharmaceutical formulations, for the elicitation of specific therapeutic responses, containing as the essential active ingredient an oximino ether of an aza-dibenzo-[a,d]-cycloheptene as described above.

The invention sought to be patented in one of its process aspects is described as residing in the concept of preparing the tangible embodiments of this invention by reacting an aza-5-oxo-dibenzo-[a,d]-cycloheptene, or its 10,11-dihydro analog, with a di-lower alkylamino-lower-alkoxyamine thereby producing the tangible embodiments directly.

The invention sought to be patented in still another of its process aspects is described as residing in the concept of preparing the tangible embodiments of the instant invention by reacting an aza-5-oxo-dibenzo-[a,d₅cycloheptene, or its 10,11-dihydro analog with hydroxylamine and subsequently alkylating the oxime resulting therefrom with a di-lower-alkylamino-lower-alkyl halide.

The tangible embodiments of this invention possess the inherent applied use characteristic of exerting an antihistaminic effect and an anti-depressant effect on the central nervous system when administered to animals displaying histamine induced allergic reactions and/or central nervous system depression respectively.

The tangible embodiments of the instant invention are illustrated by the following structural formula:

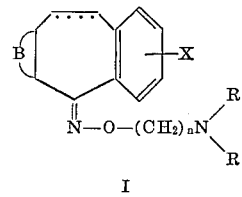

I wherein B together with the carbon atoms to which it is attached represents a fused pyridine ring in which the nitrogen atom may optionally occupy positions 1, 2, 3 or 4 giving rise to 1-aza, 2-aza, 3-aza and 4-aza derivatives: R is lower alkyl; $n$ is a positive integer of 2 to 4; X is a member of the group hydrogen, chlorine, bromine, trifluoromethyl, lower alkyl and lower alkoxy; and the dotted line represents a facultative double bond.

As used herein the terms, "lower alkyl" and "lower alkoxy" include straight and branched chain groups having from 1 to 4 carbon atoms. Typical are such groupings as methyl, ethyl, isobutyl, ethoxy, propoxy, isobutoxy and the like. It will be obvious to one skilled in the art that the lower alkyl moieties, together with the nitrogen atom to which they are attached, may be joined to form saturated heterocycles, such as morpholino, pyrrolidino, piperidino and the like. These heterocycle embodiments do not differ in their applied use characteristics in "kind" from their straight and branched chain analogs but may differ somewhat in degree. Applicant, therefore, considers such structures to be the full equivalent of the di-lower alkylamino groups they replace.

The reactants used to prepare the tangible embodiments of this invention are preferably di-lower-alkyl-amino-lower-alkoxyamines and the aza-5-oxo-dibenzo-[a,d]-cycloheptenes including their 10,11-dihydro analogs. The aza-5-oxo-dibenzo-[a,d]-cycloheptenes and their 10,11-dihydro analogs are well-known in the art, their preparation being described in Belgian Patent No. 647,043.

The substituted hydroxylamine reactants are prepared by the reaction of acetone oxime (I) with a di-alkyl-amino-alkyl halide, dimethylaminoethyl chloride (II) for example, in an inert solvent such as benzene in the presence of a base, such as, sodamide or sodium ethoxide. The dimethylaminoethoximino derivative (III) is treated with dilute mineral acid the oxime is split generating acetone and the requisite alkoxyamine (IV).

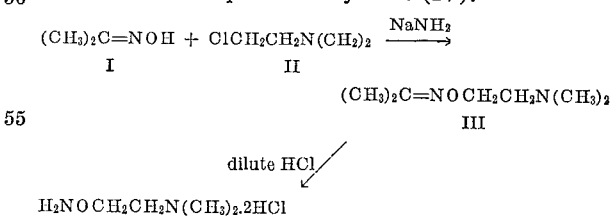

The tangible embodiments of this invention are prepared in a polar organic solvent, such as alcohols and glycols, ethanol for example, in the presence of a tertiary amine like triethylamine or pyridine. Ethanol-pyridine mixtures have been found satisfactory for this purpose. A mixture of an aza-5-oxo-dibenzo-cycloheptene (V), the substituted hydroxylamine (dimethylaminoethoxyimine dihydrochloride, IV), ethanol and pyridine are heated to reflux whereupon oximation at the 5-position takes place yielding the tangible embodiment as its hydrochloride salt. The free amine, (VI) is liberated by treatment of the salt with dilute base, such as dilute aqueous solutions of alkali metal hydroxides or carbonates, followed by extraction with a water immiscible organic solvent such as chloroform from which the free base is isolated. The foregoing reactions are sequentially illustrated below:

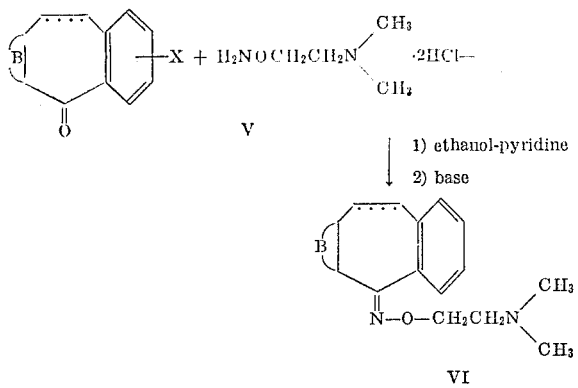

An alternate process for the preparation of the tangible embodiments of this invention is that wherein an aza-5-oxo-dibenzo-[a,d]-cycloheptene is dissolved in a solvent mixture such as ethanol-pyridine to which is added hydroxylamine hydrochloride. Upon refluxing the mixture, the 5-oxime is formed, the 5-oxime is alkylated with a dialkylaminoalkyl halide such as dimethylaminoethyl chloride in an inert organic solvent.

The method of achieving an anti-histaminic effect in warm-blooded animals is effected by administering a therapeutically effective quantity of a compound of this invention (as defined in Formula I). The therapeutically effective quantity of the compound of this invention (I) may readily be ascertained by standard and well-known techniques in the art. One such laboratory technique for the determination of antihistaminic activity is an assay similar to that reported by Labelle, A. and Tislow, R.: The Jour. of Pharm. and Eper. Therapeutics, 113: 72, 1955, briefly described as follows: The compounds are assayed for their ability to protect normal guinea pigs against death caused by intravenous injection of 1.1 mg./kg. of histamine dihydrochloride (2 times the $LD_{99}$). The test drugs are administered orally to fasted animals one hour prior to challenge with histamine. The dose response values are used to determine the dose protecting 50% of the animals ($PD_{50}$) from death. From the foregoing test procedures and by other standard laboratory techniques, as well as by comparison with well-known anti-histaminic agents, the therapeutically effective dosage range for the compounds of this invention for achieving an anti-histaminic effect is 80–150 γ/kg. of body weight per day. Although it is expected that a therapeutically effective dosage will be orally administered in 3–4 divided doses, the actual total daily dosage will depend upon the degree of severity of the histamine reaction (urticaria, vasomotor rhinitis, allergic eczema and contact dermatitis) by the warm-blooded animal.

The method of achieving an anti-depressant effect in warm-blooded animals is effected by administering a therapeutically effective quantity of a compound of this invention (as defined by Formula I). The therapeutically effective quantity of a compound of this invention (I) may readily be ascertained by standard and well-known techniques in the art. One such laboratory technique for the determination of anti-depressant activity is a Tetrabenazine Antagonism assay similar to that described by V. G. Vernier et al., p. 683, in "Psychosomatic Medicine" edited by J. H. Nodine and J. H. Moyer, 1962, as follows: Group of 10 male Carworth Farm (CF No. 1) mice are orally administered the test compound and thirty minutes after administration of the test drug the mice are intraperitoneally injected with 30 milligrams per kilogram of body weight of tetrabenzine methane sulfonate. After thirty minutes the test compound is evaluated for the degree of ptosis developed in the mice. A rating scale of 0–4 is employed with 4 representing a normal palpebral opening, and scores of 3, 2, 1 and 0 represent slight, moderate, marked and complete closure of the palpebral opening (ptosis), respectively. Based upon ratings with compounds known to exhibit significant anti-depressant effects, as well as compounds known not to exhibit anti-depressant effects, a rating of 2 or more is considered to be indicative of a significant anti-depressant activity. From the foregoing test procedures and by other standard laboratory techniques, as well as by comparison with well-known anti-depressant agent, the therapeutically effective dosage range for the compounds of this invention for achieving an anti-depressant effect is 2–5 mg./kg. of body weight. Although it is expected that a therapeutically effective dosage will be orally administered in 3–4 divided doses, the actual total daily dosage will depend upon the degree of severity of the depression of the warm-blooded animal, its cause and other health factors. Thus, in each specific instance the attending diagnostician will determine the actual dosage frequency and degree of anti-depression sought to be achieved.

The tangible embodiments of this invention can be administered orally in the form of tablets, capsules, elixirs and the like. In tablet form, they are compounded with an inert pharmaceutical carrier which may contain a suitable binder such as, for example, gums, starches and sugars. They may also be incorporated into a gelatin capsule and also formulated into elixirs which have the advantage of being susceptible to manipulations in flavor by the addition of standard natural or synthetic flavoring materials. Further the tangible embodiments of this invention may be advantageously employed in injectable formulations suitable for parental admininstration.

In any of the formulations noted above the tangible embodiments of this invention may be employed either as the free base or in the form of non-toxic pharmaceutically acceptable acid addition salts of organic and inorganic acids. These salts have the advantageous property of being crystalline solids, thereby facilitating their handling and compounding and also being more water soluble than the corresponding free base, thereby making them especially suited for use in elixirs and injectables. Exemplary of such salts are those derived from maleic, citric, tartaric, hydrochloric, hydrobromic, sulfuric and phosphoric acids.

The following examples are illustrative of the processes used to prepare the tangible embodiments of this invention.

Preparation 1.—Oxime reagent dimethylaminoethoxyamine dihydrochloride

Admix 73 g. of acetone-oxime, 118.3 g. of dimethylaminoethyl chloride, 427 g. of anhydrous potassium carbonate and 1.5 l. of benzene. Stir and reflux overnight. Cool, filter, and wash precipitate with hot benzene. Combine the filtrate and washes. Concentrate the combined solution to a residue and vacuum distill to obtain the dimethylaminoethyl ether of acetone oxime, B.P. 85–88° C./50 mm.

Admix 100 g. of the ether obtained above and 1 liter of 10% aqueous hydrochloric acid. Stir with heating on a steam bath for 15 hours. Concentrate to a residue in vacuo. Crystallize the residue from a methanol-ether solvent mixture obtaining dimethylaminoethoxyamine dihydrochloride, M.P. 181–183° C.

By substituting other di-lower alkyl-amino lower-alkyl chloride hydrochlorides for dimethylaminoethyl chloride in the above preparation, the corresponding di-lower alkylamino-lower-alkoxy-ethers are obtained. Accordingly, there may be prepared by this method oxime reagents exemplified by the following, in the form of their hydrochloride salts: 3-dimethylaminopropoxyamine, 4-dimethylaminobutoxyamine, 2-diethylaminoethoxyamine, 3-diethylaminopropoxyamine, 1-methyl - 2 - diethylaminoethoxyamine, 4-diethylaminobutoxyamine, 2-dipropylaminoethoxyamine, 3-dipropylaminopropoxyamine and 4-dipropylaminobutoxyamine.

Example 1.—4-aza-5-(2-dimethylaminoethoxyimino)-7-methoxy-10,11-dihydro-dibenzo-[a,d]-cycloheptene Dissolve 24.0 g. of 4-aza-5-oxo-7-methoxy-10,11 dihydrodibenzo-[a,d]-cycloheptene and 18.2 g. of dimethylaminoethoxyamine dihydrochloride in a solution of 250 ml. of ethanol and 50 ml. of pyridine. Heat the solution with stirring to reflux and maintain for about 4 to 8 hours. Remove the solvent in vacuo and suspend the residue in water. Render this suspension alkaline by the addition of saturated aqueous sodium bicarbonate solution. Extract the product with chloroform and wash the chloroform layer thoroughly with water to remove the residual pyridine. Concentrate the chloroform solution on a steam bath to a viscous solution and transfer to a suitable flask and vacuum distill to obtain the product of this example.

Example 2.—4-aza-5-(2-dimethylaminoethoximino)-8-chloro-10,11-dihydro-dibenzo-[a,d]-cycloheptene Dissolve 245 g. of 4-aza-5-oxo-8-chloro-10,11-dihydro-dibenzo-[a,d]-cycloheptene and 14 g. of hydroxylamine hydrochloride in a mixture of 250 ml. of ethanol and 50 ml. of pyridine. Heat this solution to reflux with stirring and maintain for about 4 hours. Remove the solvent in vacuo to a solid residue which is used in the alkylation step.

Suspend the 5-oxime prepared above in 800 ml. of benzene and treat with 11.8 g. of dimethylaminoethyl chloride and 42.7 g. of potassium carbonate at reflux with stirring for 18–20 hours. Cool the mixture to room temperature and filter. Wash the precipitate with benzene. Remove the solvent under reduced pressure and vacuum distill the residue to yield the product of this example.

Exemplary of the dialkylaminoalkyl halides one may use in the process of Example 2 are:

Diethylaminoethyl chloride
Dipropylaminoethyl bromide
Dibutylaminoethyl bromide
Dimethylaminopropyl chloride
Diethylaminopropyl chloride
Dipropylaminopropyl chloride
Dibutylaminopropyl chloride
Dimethylaminobutyl bromide
Diethylaminobutyl bromide
Dipropylaminobutyl chloride
Dibutylaminobutyl chloride.

By substituting any of the alkylating agents described above in the process of Example 2 and varying the aza-dibenzo-[a,d]-cycloheptene reactant, diverse di-lower alkylamino-lower-alkoximino ethers are prepared, of which the following are exemplary:

4-aza-5-(3-dimethylaminopropoximino)-7-methoxy-10,11-dihydro-di-benzo-[a,d]-cycloheptene
4-aza-5-(3-dimethylaminopropoximino)-8 - chloro-10,11-dihydro-dibenzo-[a,d]-cycloheptene
2-aza-5-(3-dimethylaminopropoximino)-9-trifluoromethyl-10,11-dihydro-dibenzo-[a,d]-cycloheptene
1-aza-5-(3-dimethylaminopropoximino)-6-bromo-10,11-dihydrodibenzo-[a,d]-cyloheptene
2-aza-5-(3-dimethylaminopropoxamino)-10,11-dihydro-dibenzo-[a,d]-cycloheptene
4-aza-5-(3-dimethylaminopropoximino)-7-chloro-dibenzo-[a,d]-cycloheptene
3-aza-5-(3-dimethylaminopropoximino)-7-methyl-dibenzo-[a,d]-cycloheptene
1-aza-5-(3-dimethylaminopropoximino)-7-trifluoromethyl-dibenzo-[a,d]-cycloheptene
2-aza-5-(4-dimethylaminobutoximino)-8-bromo-dibenzo-[a,d]-cycloheptene
3-aza-5-(4-dimethylaminobutoximino)-7-chloro-dibenzo-[a,d]-cycloheptene
4-aza-5-(4-dimethylaminobutoximino)-8-bromo-dibenzo-[a,d]-cycloheptene
1-aza-5-(4-dimethylaminobutoximino)-9-methyl-dibenzo-[a,d]-cycloheptene
2-aza-5-(4-dimethylaminobutoximino)-7-ethoxy-dibenzo-[a,d]-cycloheptene
4-aza-5-(4-dimethylaminobutoximino)-10,11-dihydro-dibenzo-[a,d]-cycloheptene
3-aza-5-(4-dimethylaminobutoximino)-10,11-dihydro-dibenzo-[a,d]-cycloheptene
2-aza-5-(4-dimethylaminobutoximino)-10,11-dihydro-dibenzo-[a,d]-cycloheptene
4-aza-5-(2-dimethylaminoethoximino)-7-chloro-10,11-dihydrodibenzo-[a,d]-cycloheptene
4-aza-5-(2-dimethylaminoethoximino)-8-chloro-10,11-dihydrodibenzo-[a,d]-cycloheptene
1-aza-5-(2-dimethylaminoethoximino)-6-methyl-10,11-dihydrodibenzo-[a,d]-cycloheptene
3-aza-5-(2-dimethylaminoethoximino)-9-trifluoromethyl-dibenzo-[a,d]-cycloheptene
4-aza-5-(2-dimethylaminoethoximino)-7-methoxy-dibenzo-[a,d]-cycloheptene
2-aza-5-(2-dimethylaminoethoximino)-8-methoxy-dibenzo-[a,d]-cycloheptene
1-aza-5-(2-dimethylaminoethoximino)-7-bromo-dibenzo-[a,d]-cycloheptene
3-aza-5-(2-dimethylaminoethoximino)-dibenzo-[a,d]-cycloheptene
4-aza-5-(2-diethylaminoethoximino)-dibenzo-[a,d]-cycloheptene
2-aza-5-(2-diethylaminothoximino)-7-chloro-10,11-dihydro-dibenzo-[a,d]-cycloheptene
1-aza-5-(2-diethylaminoethoximino)-7-chloro-10,11-dihydro-dibenzo-[a,d]-cycloheptene
4-aza-5-(2-diethylaminoethoximino)-7-methoxy-10,11-dihydro-dibenzo-[a,d]-cycloheptene
3-aza-5-(2-diethylaminoethoximino)-8-bromo-10,11,dihydro-dibenzo-[a,d]-cycloheptene
2-aza-5-(3-diethylaminopropoximino)-10,11-dihydro-dibenzo-[a,d]-cycloheptene
4-aza-5-(3-diethylaminopropoximino)-7-chloro-10,11-dihydro-dibenzo-[a,d]-cycloheptene
1-aza-5-(3-diethylaminopropoximino)-9-methyl-10,11-dihydro-dibenzo-[a,d]-cycloheptene
1-aza-5-(3-diethylaminopropoximino)-6-trifluoromethyl-10,11-dihydro-dibenzo-[a,d]-cycloheptene
3-aza-5-(3-diethylaminopropoximino)-8-ethoxy-10,11-dihydro-dibenzo-[a,d]-cycloheptene
2-aza-5-(3-diethylaminopropoximino)-6-methoxy-dibenzo-[a,d]-cycloheptene
4-aza-5-(2-dipropylaminoethoximino)-8-chloro-dibenzo-[a,d]-cycloheptene
4-aza-5-(2-dipropylaminoethoximino)-9-chloro-dibenzo-[a,d]-cycloheptene
2-aza-5-(2-dipropylaminoethoximino)-10,11-dihydro-dibenzo-[a,d]-cycloheptene
3-aza-5-(2-dipropylaminoethoximino)-10,11-dihydro-dibenzo-[a,d]-cycloheptene
4-aza-5-(2-dipropylaminoethoximino)-10,11-dihydro-dibenzo-[a,d]-cycloheptene
1-aza-5-(3-dibutylaminopropoximino)-6-bromo-10,11-dihydro-dibenzo-[a,d]-cycloheptene
2-aza-5-(3-dibutylaminopropoximino)-7-chloro-10-11,dihydrodibenzo-[a,d]-cycloheptene
4-aza-5-(3-dibutylaminopropoximino)-9-methoxy-10,11-dihydro-dibenzo-[a,d]-cycloheptene 3-aza-5-(3-dibutylaminopropoximino)-8-ethyl-10,11-
 dihydrodibenzo-[a,d]-cycloheptene
4-aza-5-(3-dibutylaminopropoximino)-8-methyl-di-
 benzo-[a,d]-cycloheptene
2-aza-5-(dibutylaminopropoximino)-7-chloro-dibenbo-
 [a,d]-cycloheptene
1-aza-5-(3-dipropylaminopropoximino)-8-bromo-di-
 benzo-[a,d]-cycloheptene
4-aza-5-(3-dipropylaminopropoximino)-dibenzo-
 [a,d]-cycloheptene
1-aza-5-(3-dipropylaminopropoximino)-dibenzo-
 [a,d]-cycloheptene
3-aza-5-(3-dipropylaminopropoximino)-7-methoxy-
 10,11-dihydro-dibenzo-[a,d]-cycloheptene
2-aza-5-(3-dipropylaminopropoximino)-6-methoxy-
 10,11-dihydro-dibenzo-[a,d]-cycloheptene
4-aza-5-(3-dipropylaminopropoximino) 9-trifluoro-
 methyl-10,11-dihydro-dibenzo-[a,d]-cycloheptene
4-aza-5-(3-dipropylaminopropoximino)-7-chloro-
 10,11-dihydro-dibenzo-[a,d]-cycloheptene
4-aza-5-(2-morphilinoethoximino)-10,11-dihydro-
 dibenzo-[a,d]-cycloheptene
3-aza-5-(3-pyrolidinopropoximino)-7-trifluoromethyl-
 10,11-dihydro-dibenzo-[a,d]-cycloheptene
4-aza-5-(2-piperidinoethoximino)-8-chloro-10,11-
 dihydro-dibenzo-[a,d]-cycloheptene
2-aza-5-(3-piperidinopropoximino)-10,11-dihydro-
 dibenzo-[a,d]-cycloheptene
1-aza-5-(2-pyrolidinoethoximino)-9-bromo-10,11-
 dihydro-dibenzo-[a,d]-cycloheptene.

I claim:
1. A compound selected from the group consisting of aza-dibenzo-[a,d]-cycloheptenes of the formula:

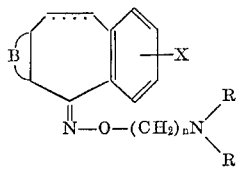

and the non-toxic pharmaceutically acceptable acid addition salts thereof, wherein B together with the carbon atoms to which it is attached represents a fused pyridine ring; R is lower alkyl; $n$ is a positive integer from 2 to 4; X is a member of the group hydrogen, chlorine, bromine, trifluoromethyl, lower alkyl and lower alkoxy; and the dotted line represents a facultative double bond.

2. A compound of claim 1 having the structural formula:

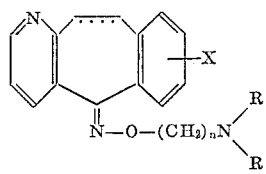

and the non-toxic pharmaceutically acceptable acid addition salts thereof, wherein R is lower alkyl; $n$ is a positive integer from 2 to 4; X is a member of the group hydrogen, chlorine, bromine, trifluoromethyl, lower alkyl and lower alkoxy; and the dotted line represents a facultative double bond.

3. A compound of claim 1 having the structural formula:

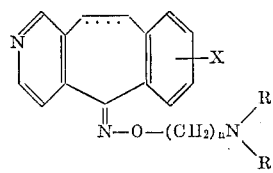

and the non-toxic pharmaceutically acceptable acid addition salts thereof, wherein R is lower alkyl; $n$ is a positive integer from 2 to 4; X is a member of the group hydrogen, chlorine, bromine, trifluoromethyl, lower alkyl and lower alkoxy; and the dotted line represents a facultative double bond.

4. A compound of claim 1 having the structural formula:

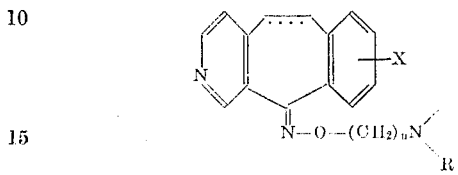

and the non-toxic pharmaceutically acceptable acid addition salts thereof, wherein R is lower alkyl; $n$ is a positive integer from 2 to 4; X is a member of the group hydrogen, chlorine, bromine, trifluoromethyl, lower alkyl and lower alkoxy; and the dotted line represents a facultative double bond.

5. A compound of claim 1 having the structural formula:

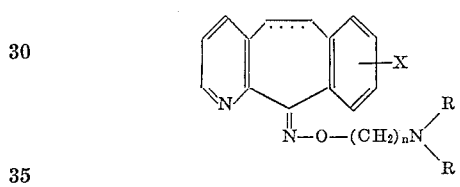

and the non-toxic pharmaceutically acceptable acid addition salts thereof, wherein R is lower alkyl; $n$ is a positive integer from 2 to 4; X is a member of the group hydrogen, chlorine, bromine, trifluoromethyl, lower alkyl and lower alkoxy; and the dotted line represents a facultative double bond.

6. 4-aza-5-(3-dimethylamonopropoximino) - 7 - methoxy-10,11-dihydro-dibenzo-[a,d]-cycloheptene.
7. 4-aza-5-(2-dimethylaminoethoximino) - 8 - chloro-10,11-dihydro-dibenzo-[a,d]-cycloheptene.
8. 4-aza-5-(2-diethylaminoethoximino) - 8 - chloro-10,11-dihydro-dibenzo-[a,d]-cycloheptene.
9. 4-aza-5-(3-diethylaminopropoximino - 10,11 - dihydro-dibenzo-[a,d]-cycloheptene.
10. 4-aza-5-(2-dimethylaminoethoximino) - 10,11 - dihydro-dibenzo-[a,d]-cycloheptene.
11. 4-aza - 5 - (3-dimethylaminopropoximino)-10,11-dihydro-dibenzo-[a,d]-cycloheptene dihydrochloride.
12. 4-aza-5-(2-dimethylaminoethoximino) - 8 - chloro-dibenzo-[a,d]-cycloheptene dihydrochloride.
13. 4-aza-5-(2-diethylaminoethoximino) - 8 - chloro-dibenzo-[a,d]-cycloheptene maleate.
14. 4-aza - 5 - (3-diethylaminopropoximino)-dibenzo-[a,d]-cycloheptene.

References Cited

UNITED STATES PATENTS 3,366,635   1/1968   Villani _____ 260—290

HENRY R. JILES, Primary Examiner

ALAN L. ROTMAN, Assistant Examiner

U.S. Cl. X.R.

260—247.5, 294.7, 296; 424—263

UNITED STATES PATENT OFFICE
CERTIFICATE OF CORRECTION

Patent No. 3,458,524          Dated July 29, 1969

Inventor(s) FRANK J. VILLANI

It is certified that error appears in the above-identified patent and that said Letters Patent are hereby corrected as shown below:

Column 2, line 51 (formula II) $ClCH_2CH_2N(CH_3)_2$

Column 8, claim 4 

Column 8, line 45 (claim 6) (3-dimethylaminopropoximino)

SIGNED AND
SEALED
APR 28 1970

(SEAL)
Attest:

Edward M. Fletcher, Jr.
Attesting Officer

WILLIAM E. SCHUYLER, JR.
Commissioner of Patents